United States Patent
Byrne

(10) Patent No.: US 11,296,778 B2
(45) Date of Patent: Apr. 5, 2022

(54) MESH NETWORK OF UNMANNED AERIAL VEHICLES ANCHORED TO A CELL SITE OF A CELLULAR RADIO ACCESS NETWORK

(71) Applicant: T-Mobile USA, Inc., Bellevue, WA (US)

(72) Inventor: Cameron Byrne, Seattle, WA (US)

(73) Assignee: T-MOBILE USA, INC., Bellevue, WA (US)

(*) Notice: Subject to any disclaimer, the term of this patent is extended or adjusted under 35 U.S.C. 154(b) by 0 days.

(21) Appl. No.: 16/903,782

(22) Filed: Jun. 17, 2020

(65) Prior Publication Data
US 2021/0399791 A1 Dec. 23, 2021

(51) Int. Cl.
| | | |
|---|---|---|
| *H04W 16/18* | (2009.01) | |
| *H04W 24/10* | (2009.01) | |
| *H04W 24/02* | (2009.01) | |
| *G08G 5/00* | (2006.01) | |
| *H04B 7/185* | (2006.01) | |
| *H04W 16/26* | (2009.01) | |
| *H04W 24/04* | (2009.01) | |
| *H04W 84/18* | (2009.01) | |

(52) U.S. Cl.
CPC ....... *H04B 7/18506* (2013.01); *G08G 5/0008* (2013.01); *G08G 5/0039* (2013.01); *G08G 5/0069* (2013.01); *H04W 16/26* (2013.01); *H04W 24/04* (2013.01); *H04W 84/18* (2013.01)

(58) Field of Classification Search
CPC ........ B64C 2201/021; B64C 2201/027; B64C 2201/122; B64C 39/024; G01S 5/04; G05D 1/104; G06K 9/0063; H04B 7/18504; H04B 7/18523; H04N 7/181; H04N 7/188; H04W 4/06; H04W 84/005
USPC ................................ 455/7, 12.1, 41.2, 67.11
See application file for complete search history.

(56) References Cited

U.S. PATENT DOCUMENTS 9,508,263 B1 * 11/2016 Teng ...................... G08G 5/006
9,524,648 B1 * 12/2016 Gopalakrishnan ..... H04K 3/224
(Continued)

OTHER PUBLICATIONS

Author Unknown, "3rd Generation Partnership Project; Technical Specification Group Radio Access Network; NR; Study on Integrated Access and Backhaul; (Release 16)," 3GPP TR 38.874 V16.0.0, Dec. 2018.
(Continued)

*Primary Examiner* — Tan H Trinh
(74) *Attorney, Agent, or Firm* — Brownstein Hyatt Farber Schreck, LLP

(57) ABSTRACT

An unmanned aerial vehicle (UAV) is disclosed. The UAV includes a flight system, a communications system, and a processing system. The communications system includes a cellular radio configured to support multiple contemporaneous communications connections, including at least a first communications connection with a cellular radio access network, at least a second communications connection with a second UAV in a set of one or more UAVs, and at least a third communications connection with a user equipment (UE) in a set of one or more UEs. The processing system is configured to control the flight system and relay communications between the cellular radio access network, the set of one or more UAVs, and the set of one or more UEs, in accordance with a mesh network protocol.

20 Claims, 9 Drawing Sheets

(56) References Cited

U.S. PATENT DOCUMENTS

| | | | | |
|---|---|---|---|---|
| 9,973,261 | B1* | 5/2018 | Hardy | H04B 7/18523 |
| 10,925,114 | B1* | 2/2021 | Smith | H04B 7/18506 |
| 2012/0112008 | A1* | 5/2012 | Holifield | B64C 27/02 |
| | | | | 244/155 A |
| 2014/0343752 | A1* | 11/2014 | Fisher | G08G 5/02 |
| | | | | 701/2 |
| 2016/0347462 | A1* | 12/2016 | Clark | B64D 17/80 |
| 2016/0370800 | A1* | 12/2016 | Chau | G05D 1/0088 |
| 2017/0061813 | A1* | 3/2017 | Tao | G09B 9/46 |
| 2017/0069214 | A1* | 3/2017 | Dupray | G08G 5/0013 |
| 2017/0096075 | A1* | 4/2017 | Henry | B64F 1/20 |
| 2017/0371354 | A1* | 12/2017 | Matus | B64C 27/08 |
| 2018/0068567 | A1* | 3/2018 | Gong | B64C 39/024 |
| 2019/0112049 | A1* | 4/2019 | Phan | B64D 5/00 |
| 2019/0121371 | A1* | 4/2019 | Russell | G08G 5/0013 |
| 2019/0139421 | A1* | 5/2019 | Nilsson | G05D 1/106 |
| 2019/0295426 | A1* | 9/2019 | Nilsson | G08G 5/0043 |
| 2020/0017218 | A1* | 1/2020 | Ahmad | B64D 1/08 |
| 2020/0089220 | A1* | 3/2020 | Schmalzried | G07C 5/008 |
| 2020/0186603 | A1* | 6/2020 | Venugopalan | G07C 5/085 |
| 2020/0229206 | A1* | 7/2020 | Badic | H04W 4/023 |
| 2020/0241575 | A1* | 7/2020 | Meisenholder | G05D 1/12 |
| 2020/0250993 | A1* | 8/2020 | Li | G08G 5/0091 |
| 2020/0300579 | A1* | 9/2020 | Baumgartner | B64D 7/00 |
| 2021/0136595 | A1* | 5/2021 | Hashemi | B64C 39/024 |
| 2021/0349458 | A1* | 11/2021 | Pu | G05D 1/101 |

OTHER PUBLICATIONS

Chand et al., "Drone Based Wireless Mesh Network for Disaster/Military Environment," Journal of Computer and Communications, 6, http://www.scirp.org/journal/jcc, pp. 44-52, 2018.

Kahn et al., "A Hybrid Communication Scheme for Efficient and Low-Cost Deployment of Future Flying Ad-Hoc Network (FANET)," Drones 3, 16; doi:10.3390/drones3010016, 2019.

Marchese, "IoT and UAV Integration in 5G Hybrid Terrestrial-Satellite Networks," Sensors 19, 3704; doi:10.3390/s19173704, 2019.

* cited by examiner

MESH NETWORK OF UNMANNED AERIAL VEHICLES ANCHORED TO A CELL SITE OF A CELLULAR RADIO ACCESS NETWORK

FIELD

Embodiments described herein relate to dynamically increasing the capacity of a cellular radio access network, to alleviate congestion, provide coverage for a cell site that is not currently operational, and so on.

BACKGROUND

Aerial vehicles, and particularly unmanned aerial vehicles operating relatively closer to the earth's surface (e.g., drones), may be used for various purposes. These purposes include, for example, reconnaissance, mapping, delivery, communications, and purely recreational purposes. As the number of use cases for unmanned aerial vehicles (UAVs) has increased, so too has the type and robustness of UAV communications systems increased. Because of their relatively lower flight altitudes (in many cases), some UAVs may include a cellular radio and antenna that enable the UAV's communications system to connect to a cellular radio access network, similar to how user equipment (i.e., one or more UEs) may connect to a cellular radio access network. A UAV connected to a cellular radio access network may, for example, download reconnaissance photos or sensed parameters (e.g., weather information); provide streaming video of what the UAV sees; provide diagnostic information to a remote server or device; or report the UAV's location.

SUMMARY

This summary is provided to introduce a selection of concepts, in simplified form, that are further described in other sections. This summary is not intended to identify key features or essential features of the claimed subject matter, nor is it intended to be used as an aid in determining the scope of the claimed subject matter.

Described herein are unique systems, methods, devices, and apparatus that enable a cell site of a cellular radio access network to improve its coverage or extend its coverage area using a mesh network. For example, a cellular radio (or macro cell) of the cell site may operate as a donor node (or anchor) for a mesh network, and a set of cellular radios (or set of small cells) carried by a set of UAVs may operate as a set of child nodes of the mesh network. Each UAV may communicate with one or more of the cellular radio access network, other UAVs, or UEs. In some cases, the cell site may transmit a flight plan and/or other instructions or information to a UAV over the mesh network. In some cases, this may enable the cell site to communicate with UAVs and UEs that are outside its cellular communications range.

More specifically, a first UAV is described herein. The first UAV may include a flight system, a communications system, and a processing system. The communications system may include a cellular radio configured to support multiple contemporaneous communications connections, including a first communications connection with a cellular radio access network, a second communications connection with a second UAV in a set of one or more UAVs, and a third communications connection with a user equipment (UE) in a set of one or more UEs. The processing system may be configured to control the flight system and relay communications between the cellular radio access network, the set of one or more UAVs, and the set of one or more UEs, in accordance with a mesh network protocol.

Also disclosed is a cell site. The cell site may include a first cellular radio and a processing system. The processing system may be configured to transmit a flight plan to a UAV via the first cellular radio; cause the UAV to execute the flight plan and fly to a location indicated by the flight plan; and operate the first cellular radio as a donor node for a mesh network, the mesh network including a second cellular radio carried by the UAV and operated as a child node of the mesh network.

Also disclosed is another UAV. The UAV may include a flight system, a cellular radio, and a processing system. The cellular radio may be configured to support a communications connection with at least a second UAV. The first UAV and the second UAV may be members of a set of UAVs. The processing system may be configured to communicate with a cellular radio access network over a mesh network formed using a set of cellular radios carried by the set of UAVs, and control the flight system in response to instructions or information received from the cellular radio access network over the mesh network.

BRIEF DESCRIPTION OF THE DRAWINGS

The disclosure will be readily understood by the following detailed description in conjunction with the accompanying drawings, wherein like reference numerals designate like structural elements.

Figure 1A:
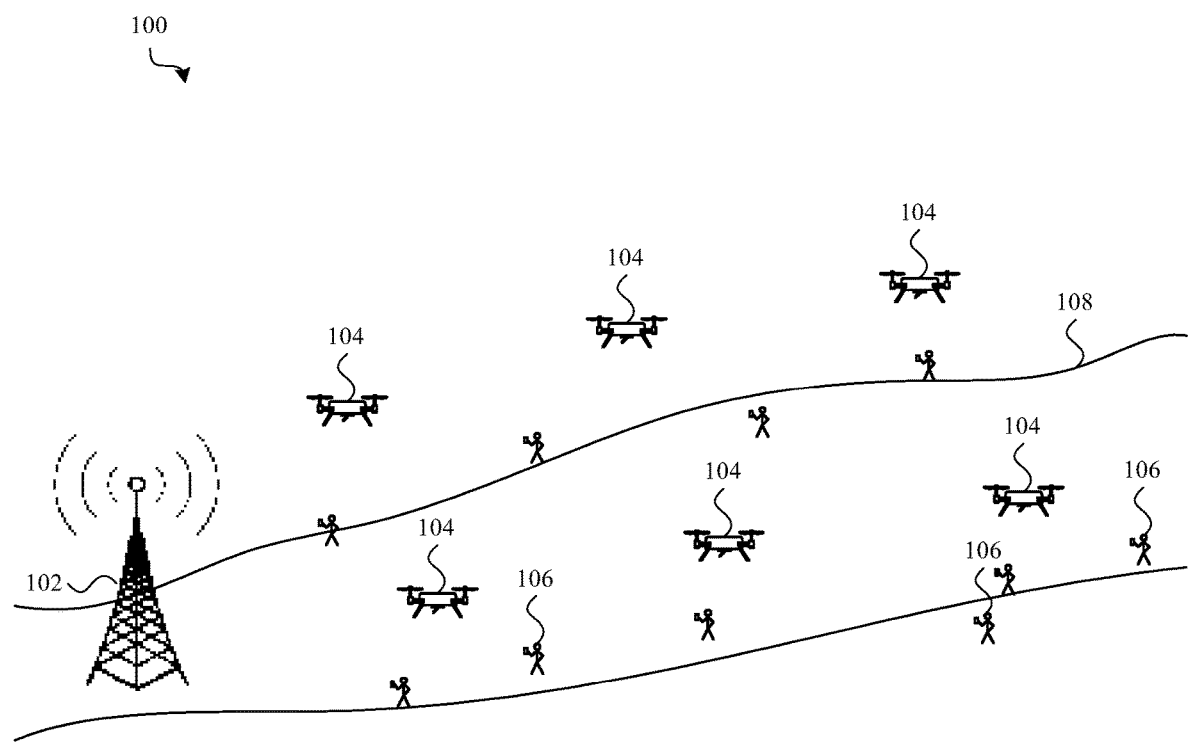
FIGS. 1A and 1B show an example mesh network anchored to a cell site of a cellular radio access network.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

There are scenarios in which a dynamic increase in cellular communications capacity is needed. These scenarios include, for example, a large sport event (e.g., a football game that fills a large scenario for several hours, once a week); an annual music festival held in a field or outdoor concert venue; and a disaster situation that knocks out a cell tower and/or power to a cell site. Described herein are techniques for increasing cellular communications capacity, such as Third Generation Partnership Project Fifth Generation New Radio (3GPP 5G NR) cellular communications capacity or other millimeter wave communications capacity. The techniques may also be used to increase other types of cellular communications capacity, such as 3GPP Fourth Generation (3GPP 4G) or 3GPP Long Term Evolution (3GPP LTE) communications capacity. The techniques may increase 3GPP 5G NR capacity in the above and other scenarios by deploying a plurality of UAVs carrying cellular radios. The cellular radios carried by the UAVs may form a mesh network anchored by a cellular radio at a cell site of a cellular radio access network. Each UAV in the mesh network may connect to the cellular radio access network directly or through one or more other UAVs. Each UAV may also connect to one or more UEs directly or through other UAVs. In some cases, the UAVs may be controlled by propagating instructions or information for controlling the UAVs over the mesh network. For example, a cell site may transmit a flight plan, or an updated flight plan, to a UAV. The flight plan may be transmitted to a UAV directly or through one or more other UAVs. This can enable control of a UAV through a cell site even when the UAV is out of range of the cell site.

A cell site's deployment of a cellular radio (e.g., small cells) carried by UAVs may enable the deployment of a mesh network faster and more dynamically than when a mesh network is formed by small cells that need to be installed at fixed locations.

Figure 1B:
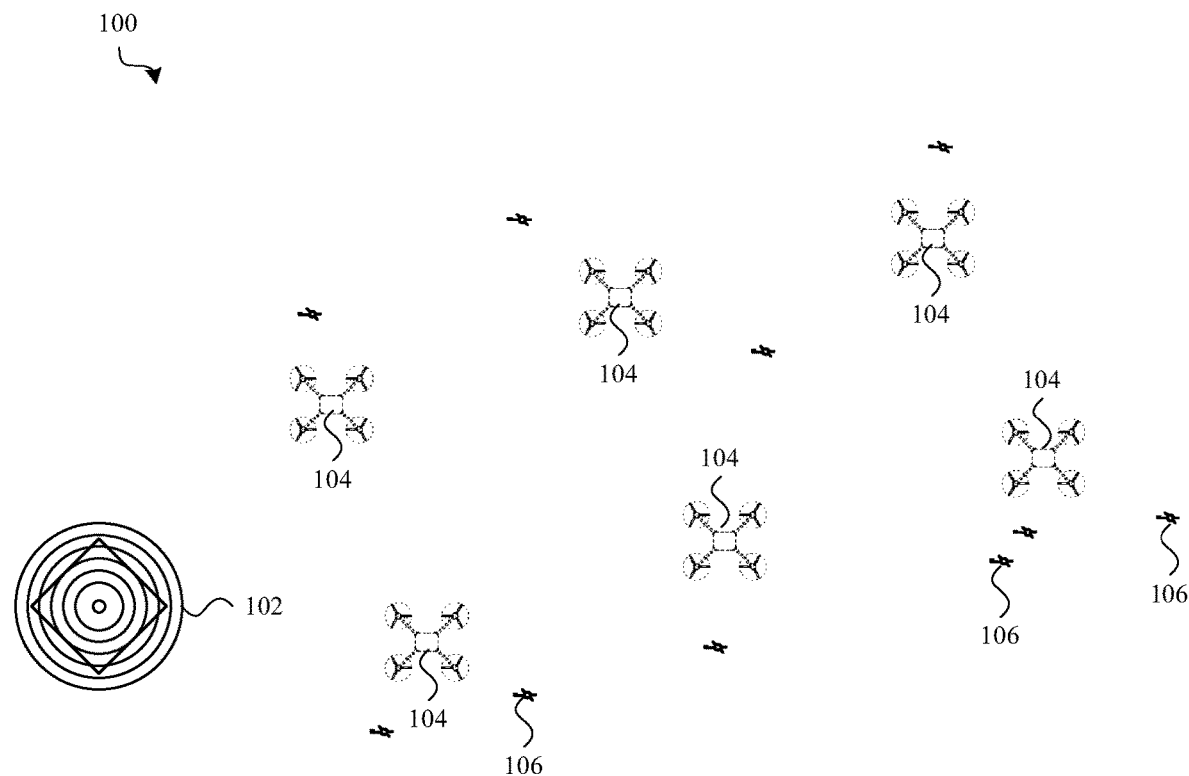

FIGS. 1A and 1B show an example mesh network 100 anchored to a cell site 102 of a cellular radio access network. FIG. 1A shows an elevation of the cell site 102 and a set of a UAVs 104. FIG. 1B shows a plan view of the cell site 102 and set of UAVs 104. A cellular radio (or macro cell) of the cell site 102 may operate as a donor node (or anchor) for the mesh network 100, and a set of cellular radios (or set of small cells) carried by a set of UAVs 104 may operate as a set of child nodes of the mesh network 100. In some cases, the cellular radios of one or more of the UAVs 104 may be in direct communication with the cellular radio of the cell site 102, and the cellular radios of one or more other UAVs 104 may be in communication with the cellular radio of the cell site 102 via the cellular radios of one or more other UAVs 104.

Each of the UAVs 104 may be configured to relay (i.e., receive and forward) communications between the cellular radio access network, other UAVs 104 in the set of UAVs 104, and a set of one or more UEs 106. A UAV 104 may therefore operate as a child node and/or a relay node of the mesh network 100. Communications may be relayed, by a UAV 104, in accordance with a mesh network protocol (e.g., a self-organizing network protocol). In some embodiments, the cellular radio access network may be a 3GPP 5G NR cellular radio access network, and the cellular radios of the cell site 102, UAVs 104, and UEs 106 may be configured to support a 3GPP 5G NR communications protocol. In some embodiments, the mesh network protocol may be a 3GPP 5G NR Integrated Access and Backhaul (JAB) protocol, with the cellular radio of the cell site 102 being configured as a 3GPP 5G NR JAB donor node, and the cellular radio of each UAV 104 being configured as a 3GPP 5G NR JAB child node.

The mesh network 100 may be dynamically instantiated, modified, or disbanded. In one scenario, the cell site 102 may be located at or near a field 108. The cell site 102 may be a fixed cell site (e.g., a cell site installed on the ground or on top of a building) or a mobile cell site (e.g., a cell site carried by a truck). A landowner may decide to host a concert, festival, or other event in the field 108, and the field 108 may transition to a normal occupancy of zero persons to a concert or festival occupancy of 5,000 persons. To provide cellular coverage for the concert or festival, a mesh network may be instantiated or grown, and some or all of the UAVs 104 may be deployed to extend the size or footprint of the geographic area serviced by the cell site 102. In some cases, the mesh network may be instantiated or grown in response to determining that a congestion of the cell site 102 or one of its cellular radios (e.g., a cellular radio that services a particular sector extending from the cell site) satisfies a congestion threshold. The congestion threshold may be based on reports of poor radio coverage; determined signal strengths of communications with UEs; information pertaining to the opening of a new office building, sport venue, apartment building, or neighborhood; information indicating that one or more nearby cell sites are not operational or congested; and so on.

A determination regarding whether the cell site 102 or one of its cellular radios satisfies a congestion threshold may be made by a processing system of the cell site 102, or may be made by a core network and/or edge computing resource to which the cell site 102 is connected. In the latter case, an indication that a congestion of the cell site 102 or one of its cellular radios satisfies a congestion threshold may be received from the core network and/or edge computing resource. In either case, the processing system of the cell site 102 may, in response to a determination or received indication that the congestion satisfies the threshold, cause one or more of the UAVs 104 to execute a flight plan and fly to a location indicated by the flight plan. A UAV's flight plan may be provided (e.g., wirelessly transmitted) to the UAV 104 by the cell site 102. The entirety of a flight plan may be provided to a UAV 104 before it takes off, or only part of the flight plan may be provided to the UAV 104 before it takes off, and updates to the flight plan may be provided to the UAV 104 after it is in the air. When multiple UAVs 104 are deployed, different flight plans may be provided to different UAVs 104, so that a desired cellular coverage (or congestion relief) may be provided for the users and UEs 106 located in the field 108.

In another scenario, the cell site 102 may be located near a stadium or sport venue, and the mesh network 100 may be instantiated or grown, and some or all of the UAVs 104 may be deployed, to provide more capacity for the users and UEs 106 visiting the stadium or sport venue. In yet another scenario, the cell site 102 may be located near a freeway that becomes temporarily congested, or near a city street that serves as a parade route. In these scenarios, the mesh network 100 may be instantiated or grown, and some or all of the UAVs 104 may be deployed, to provide more capacity for the users and UEs 106 located in a traffic jam or positioned along the parade route. In another scenario, a disaster may knock out one or more small cells attached to telephone poles, or even a cell site, causing a cellular coverage "hole." In such a scenario, UAVs 104 may be launched by a nearest functioning cell site 102 to cover the hole.

The cell site 102 may include, for example, a cell tower, an equipment cabinet, one or more antennas mounted atop the cell tower, one or more cellular radios mounted atop the cell tower or in the equipment cabinet and connected to the antenna(s), baseband processing equipment and a power source (e.g., a connection to a power grid, a generator, and/or a battery) connected to the cellular radio(s), and a landing pad for one or more of the UAVs 104. In some embodiments, the cell site 102 may include other or different components. The cell site 102 may be connected to a core network, edge computing resources, the Internet, and so on.

The UAVs 104 may take off from and land on the landing pad, and may remain on the landing pad when not in use. Alternatively, the UAVs 104 may be positioned on the landing pad prior to when they are needed, and removed when they are not needed. In some cases, some or all of the UAVs 104 may take off from and land on remote landing pads (i.e., landing pads that are remote from the cell site 102). Remote landing pads may be provided on the ground, on rooftops, on vehicles, on barges, and so on.

The UAVs 104 may take the same or different forms, and in some cases may take the form of drones or balloons.

Figure 2:
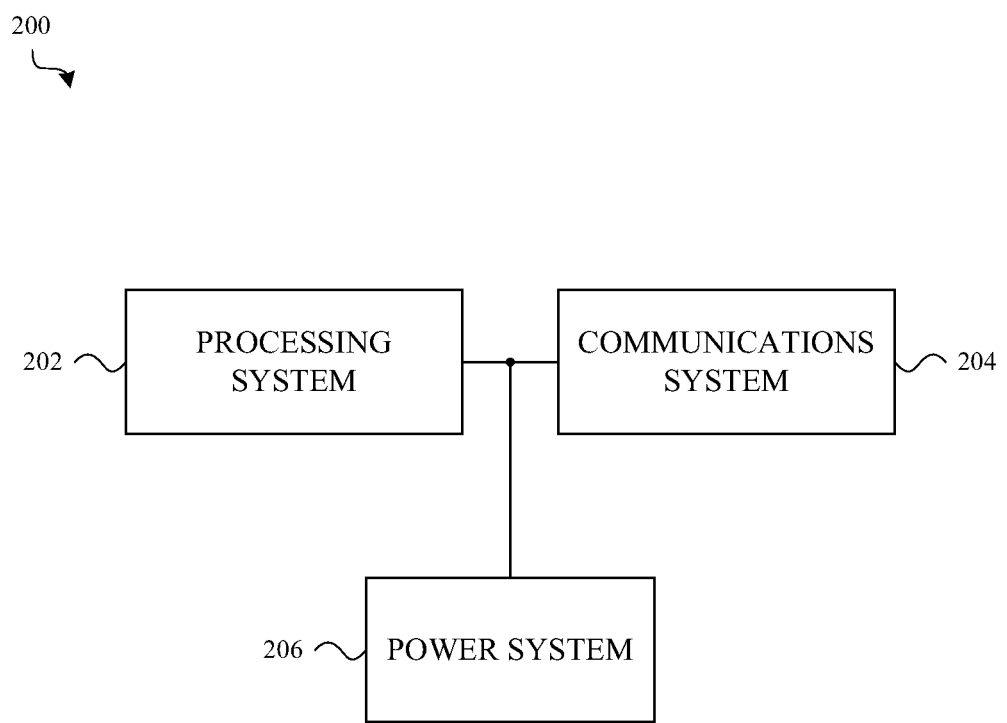
FIG. 2 shows an example block diagram of a cell site.

FIG. 2 shows an example block diagram of a cell site 200. In some embodiments, the cell site 200 may be the cell site described with reference to FIGS. 1A and 1B. By way of example, the cell site 200 may include a processing system 202, a communications system 204, and a power system 206.

The processing system 202 may include one or more processors (e.g., microprocessors, controllers, and so on), which may be provided in a single component or distributed across multiple components. For example, the processing system 202 may take the form of a discrete computer system, or may alternatively or additionally include processors that are integrated with the communications system 204, the power system 206, and/or other systems. The processing system 202 may be used to control the communications system 204 and/or devices that communicate with or via the communications system 204 (e.g., UAVs, UEs, and a core network or edge computing resources), and in some cases may control the power system 206. In some cases, the processing system 202 may be used to control the transfer of data between different components of the communications system 204 (or between different devices that communicate with each other via the communications system 204). The processing system 202 may also communicate with remote devices via the communications system 204.

The communications system 204 may include one or more radios, one or more antennas, baseband processing equipment, and so on. The baseband processing equipment may in some cases be considered part of the processing system 202. The radios may include one or more cellular radios, but may also include other radios (e.g., one or more of a Wi-Fi radio, BLUETOOTH® radio, and so on). The communications system 204 may be configured (or used) to relay communications between a core network or edge computing resources and one or more UAVs and/or UEs. The communications system 204 may also be configured (or used) to relay communications between UAVs and/or UEs. Still further, the communications system 204 may be configured (or used) to relay communications between UAVs, UEs, the core network and/or edge computing resources, and the processing system 202 of the cell site 200.

The power system 206 may include, for example, one or more of a connection to a power grid, a generator, and/or a battery. The power system 206 may be used to power the processing system 202, the communications system 204, and/or other systems. In some cases, the power system 206 may be used to charge the batteries of one or more UAVs. In some embodiments, the power system 206 may be monitored and controlled by the processing system 202. For example, the processing system 202 may detect interruptions or fluctuations in the power provided by the power grid, and switch the cell site to battery or generator power when needed. The processing system 202 may also determine when to charge the battery via the power grid or generator, or determine when the status (e.g., health) of the power system 206 dictates the trigger of an alert that is to be sent to a remote device via the communications system 204.

In some embodiments, the processing system 202 (and/or the core network or an edge computing resource) may be configured to determine a congestion or other parameter of the cell site 200 or one of its cellular radios, and instantiate or grow a mesh network including cellular radios carried by UAVs. For example, the processing system 202 may determine that a congestion of the cell site 200 or one of its cellular radios (e.g., a cellular radio that services a particular sector extending from the cell site) satisfies a congestion threshold. In response to a determination or received indication that the congestion satisfies the threshold (e.g., from the core network or an edge computing resource), the processing system 202 may cause one or more UAVs to execute a flight plan and fly to a location indicated by the flight plan. A UAV's flight plan may be provided (e.g., wirelessly transmitted) to the UAV via the communications system 204. The entirety of a flight plan may be provided to a UAV before it takes off, or only part of the flight plan may be provided to the UAV before it takes off, and updates to the flight plan may be provided to the UAV after it is in the air. When multiple UAVs are deployed, different flight plans may be provided to different UAVs, so that a desired cellular coverage (or congestion relief) may be provided for the users and UEs located in the field.

In some embodiments, the processing system 202 (and/or the core network or an edge computing resource) may be configured to transmit a flight plan to a UAV via the cellular radio. Alternatively, the flight plan may be transmitted to the UAV via the Wi-Fi radio, the BLUETOOTH® radio, or another radio. The processing system 202 may also cause the UAV to execute the flight plan. In some embodiments, the processing system 202 may cause the UAV to execute the flight plan by including execution information within the flight plan (e.g., an absolute time at which the flight plan is to be executed, a relative time at which the flight plan is to be executed (e.g., a time until execution), or one or more trigger conditions that trigger the UAV to execute the flight plan. Alternatively, the processing system 202 may cause the UAV to execute the flight plan by transmitting, to the UAV, an instruction or instructions to execute the flight plan. In some embodiments, the flight plan and any instructions for causing the UAV to execute the flight plan, update the flight plan, and so on, may be transmitted to the UAV using the cellular radio. In some embodiments, instructions or information may be transmitted from the cell site 200 to a UAV using a cellular radio of the cell site 200, and may be transmitted using an IP protocol.

The flight plan may cause the UAV to fly to a location indicated by the flight plan.

Before, while, or after the UAV takes off, the processing system 202 may operate the cellular radio as a donor node for a mesh network, and configure a cellular radio carried by the UAV as a child node of the mesh network.

In some embodiments, the processing system 202 (and/or the core network or an edge computing resource) may be configured to receive a status of a battery of the UAV. When the UAV is in the air, the processing system 202 may receive the status of the battery and determine, using the status, whether a remaining flight time of the UAV satisfies a threshold. When the remaining flight time satisfies the threshold (e.g., is less than a particular flight time), the processing system 202 may update the flight plan of the UAV (e.g., via the cellular radio or another radio), to cause the UAV to return to a landing pad so that its battery may be recharged. In some cases, the UAV may be a first UAV, and the processing system 202 may transmit a second flight plan to a second UAV (e.g., via the cellular radio or another radio). In response to determining that the remaining flight time of the first UAV satisfies the threshold, the processing system 202 may cause the second UAV to execute the second flight plan, and cause a cellular radio carried by the second UAV to be operated as a replacement for the cellular radio of the first UAV within the mesh network. In this manner, a UAV may be replaced by another UAV to provide continuous cellular coverage for the UEs that are serviced by a mesh network.

In some embodiments, the processing system 202 (and/or the core network or an edge computing resource) may be configured to transmit different flight plans directly to different UAVs, all of which may carry cellular radios that form part of a mesh network. In some embodiments, the processing system 202 (and/or the core network or an edge computing resource) may transmit, to a first UAV and via the cellular radio of the cell site, a second flight plan for a second UAV. The second flight plan may be transmitted to the first UAV before, while, or after the first UAV takes off. In some cases, the processing system 202 may also transmit, to the first UAV, a first set of one or more instructions and a second set of one or more instructions. The first instruction may cause the second UAV to execute the second flight plan, and the second instruction may cause the first UAV to transmit the second flight plan and/or the first instruction to the second UAV. In this manner, the processing system 202 may use the first UAV to transmit the second flight plan, to the second UAV, when the cell site 200 lacks line-of-sight access with a landed position of the second UAV (e.g., when the second UAV takes off from and lands on a landing pad that is remote from the cell site). That is, the processing system 202 may cause the first UAV to maneuver to an in-air position at which the first UAV has line-of-sight access with the second UAV before the first UAV transmits the second flight plan and/or the first instruction to the second UAV. Other instructions and information may also be transmitted between the cell site and the second UAV using the first UAV as a relay node.

Figure 3:
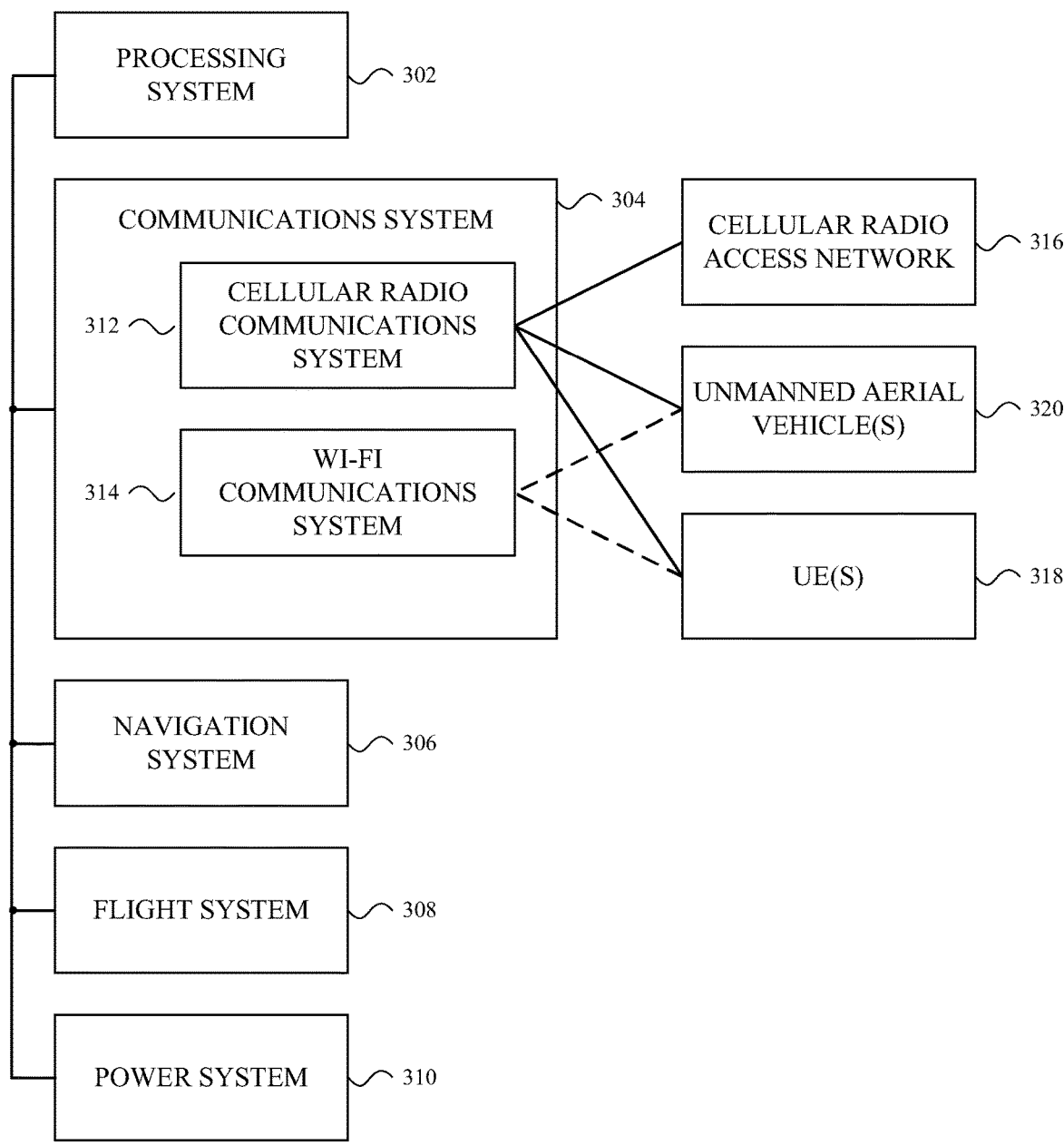
FIG. 3 shows an example block diagram of a UAV.

FIG. 3 shows an example block diagram of a UAV 300. In some embodiments, the UAV 300 may be one of the UAVs described with reference to FIG. 1A, 1B, or 2. By way of example, the UAV 300 may include a processing system 302, a communications system 304, a navigation system 306, a flight system 308, and a power system 310.

The processing system 302 may include one or more processors (e.g., microprocessors, controllers, and so on), which may be provided in a single component or distributed across multiple components. For example, the processing system 302 may take the form of a discrete processor, or may alternatively or additionally include processors that are integrated with the communications system 304, the navigation system 306, the flight system 308, the power system 310, and/or other systems. The processing system 302 may be used to control the communications system 304 and/or devices that communicate with or via the communications system 304 (e.g., UAVs, UEs, and core network or edge computing resources). The processing system 302 may also be used to control the navigation system 306, the flight system 308, and/or the power system 310. In some cases, the processing system 302 may be used to control the transfer of data between different components of the communications system 304 (or between different devices that communicate with each other via the communications system 304). The processing system 302 may also communicate with remote devices via the communications system 304.

The communications system 304 may include one or more radios, one or more antennas, and so on. The radios may include one or more cellular radios 312, but may also include other radios (e.g., one or more of a Wi-Fi radio 314, BLUETOOTH® radio, and so on). A cellular radio 312 of the communications system 304 may be configured (or used) to receive communications from a cellular radio access network 316 (or core network or edge computing resource connected thereto), UEs 318, and/or other UAVs 320. The cellular radio 312 may also be configured (or used) to relay communications between a cellular radio access network 316 (or core network or edge computing resource connected thereto) and one or more other UEs 318 and/or other UAVs 320. The cellular radio 312 may also be configured (or used) to relay communications between UAVs 320 and/or UEs 318.

The navigation system 306 may include, for example, one or more of a global positioning system (GPS) receiver, a processor that determines the UAV's location using triangulation based on cellular or Wi-Fi signals, a processor that requests the UAV's location from a remote device (e.g., using the communications system), an accelerometer, an altimeter, and so on. Information obtained from the navigation system 306 may be used by the processing system 302 to execute a flight plan and control the flight system 308.

The flight system 308 may include, for example, one or more of propellers, ailerons, jets, balloons, and so on, coupled with motors to drive or adjust the position or orientation of any of these components. The flight system 308 may be controlled by the processing system 302. For example, the processing system 302 may execute a flight plan and, in so doing, may obtain, from the navigation system 306 information regarding one or more of a position, location, orientation, pitch, yaw, roll, and so on of the UAV, which information may enable the processing system 302 to drive or adjust various components of the flight system 308 to further execute the flight plan and/or determine if a location indicated by the flight plan has been reached.

The power system 310 may include, for example, a battery and a battery charging port. The power system 310 may be used to power the processing system 302, the communications system 304, the navigation system 306, the flight system 308, and/or other systems. In some embodiments, the power system 310 may be monitored and controlled by the processing system 302, and the processing system 302 may provide a status of the battery, an indication of a remaining flight time of the UAV 300, and/or battery status alerts to a remote device. In some cases, the processing system 302 may cause the UAV 300 to return to a landing pad before the battery's charge is depleted. In some cases, the processing system 302 may provide the status of the battery, the indication of the remaining flight time of the UAV, and/or the battery status alerts to the remote device, and wait for an updated flight plan and/or instructions from the remote device.

In some embodiments, the communications system 304 may include a cellular radio 312 that is configured to support multiple contemporaneous communications connections. The multiple contemporaneous communications connections may include, for example, one or more communications connections with a cellular radio access network 316, one or more communications connections with one or more UAVs 320 in a set of one or more UAVs, and/or one or more communications connections with one or more UEs 318 in a set of one or more UEs. The processing system 302 may be configured to relay communications between one or more of the cellular radio access network 316, the set of one or more UAVs 320, and the set of one or more UEs 318 in accordance with a mesh network protocol.

In some embodiments, the processing system 302 may be configured (or used) to forward a first set of communications between a cellular radio access network 316 and one or more UEs 318 and, contemporaneously, forward a second set of communications between the cellular radio access network 316 and one or more other UAVs 320.

In some embodiments, the processing system 302 may be configured (or used) to receive, over a communications connection with the cellular radio access network 316 and/or another UAV 320, and in accordance with a mesh network protocol, an instruction or information used to control the flight system 308 (including, for example, a flight plan or an update to a flight plan).

In some embodiments, the processing system 302 may be configured (or used) to receive, over a communications connection with the cellular radio access network 316 and/or another UAV 320, and in accordance with a mesh network protocol, an instruction or information used to control a flight system of another UAV 320 (including, for example, a flight plan, an update to a flight plan, a take-off instruction or information, or one or more other in-air navigation instructions or information, such as an instruction to rotate the UAV 320 or adjust an antenna position to provide improved cellular coverage for one or more UEs). In these embodiments, the processing system 302 may be configured to operate the communications system to forward the instruction or information to, or toward, the other UAV 320. In this manner, a cell site of a cellular radio access network 316 may forward instructions or information for a UAV directly to the UAV, or to the UAV via one or more relay hops through one or more UAVs.

Figure 4:
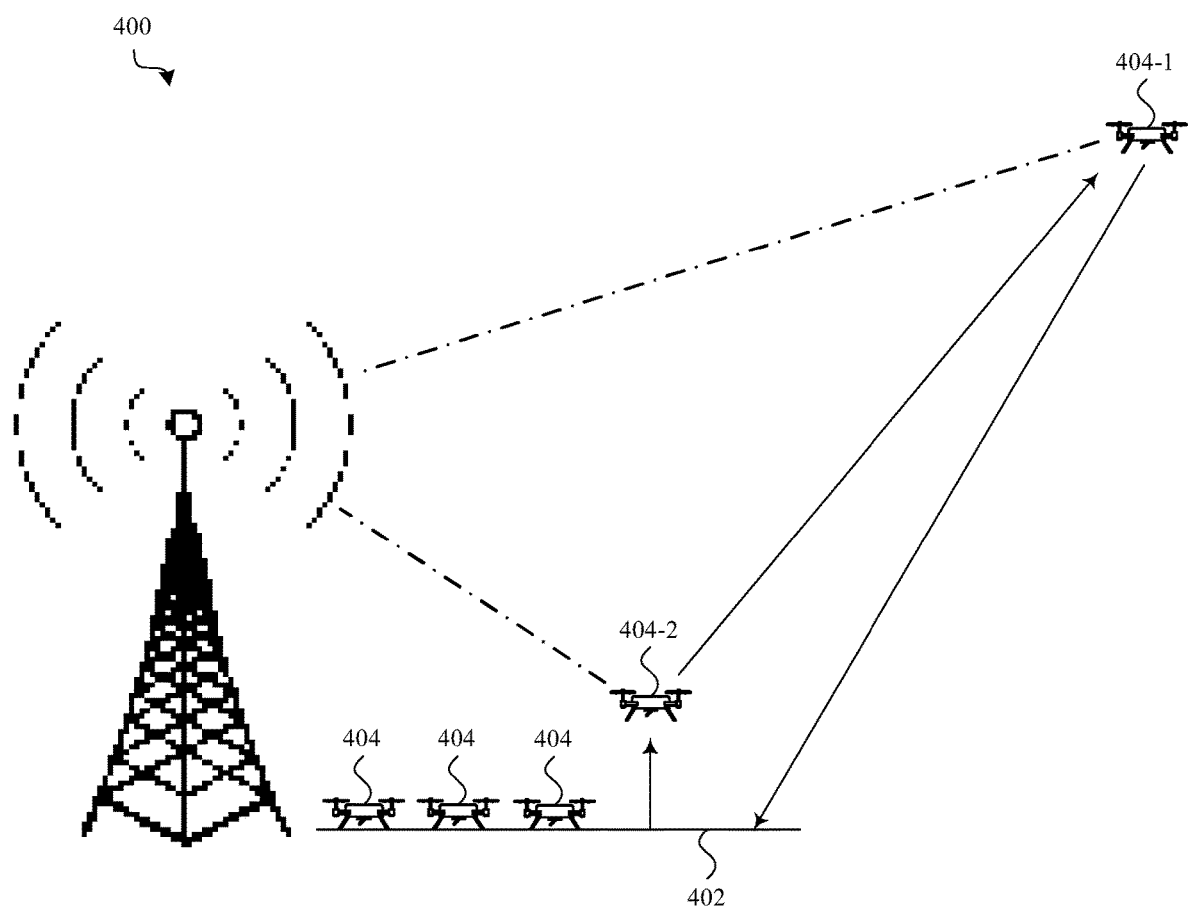
FIG. 4 shows an example cell site with a landing pad.

FIG. 4 shows an example cell site 400 with a landing pad 402. The landing pad 402 may be on the ground (as shown) or elevated (e.g., on top of an equipment cabinet or elevated platform). One or more UAVs 404 may be positioned on (or land on) the landing pad 402. In some embodiments, the cell site 400 may be one of the cell sites described with reference to FIG. 1A, 1B, or 2. In some embodiments, the UAVs 404 may be examples of the UAVs described with reference to FIG. 1A, 1B, or 3.

In some cases, the landing pad 402 may include a wireless charger for wirelessly charging the batteries of the UAVs 404, and each of the UAVs 404 may include a wireless charging interface. In some cases, a number of battery charging cables may extend near the landing pad 402, and the UAVs 404 may couple to the battery charging cables to charge their batteries. For example, a battery charging cable may have a magnetic interface that is magnetically drawn to a complementary magnetic interface of a UAV 404, such that the battery charging cable magnetically attaches to the UAV 404 when the UAV 404 lands on the landing pad 402. The attachment force of the magnetic interfaces may be strong enough to hold the battery charging cable in place while the UAV's battery is charging, but weak enough that the UAV 404 can pull free of the battery charging cable when taking off. Alternatively, a battery charging cable may automatically connect to a UAV 404 in other ways, or a user may manually connect a battery charging cable to a UAV 404.

By way of example, a set of five UAVs 404 is shown to use the landing pad 402, with four UAVs 404 currently being on the landing pad 402, and one UAV 404 being in the air. In alternative examples, any number of one or more UAVs 404 may use the landing pad 402, and none, some, or all of the UAVs 404 may be on the landing pad 402 or in the air at any given time. In particular, FIG. 4 shows an example in which a cellular radio of the cell site 400 communicates with a first UAV 404-1 in the air and a second UAV 404-2 on the ground, and instructs the second UAV 404-2 to fly to the location of the first UAV 404-1 before instructing the first UAV 404-1 to land on the landing pad 402. In some cases, the cell site 400 may simply instruct the first and second UAVs 404-1, 404-2 to respectively return and take off. In other cases, the cell site 400 may transfer a flight plan, or an updated flight plan, to one or both of the first and second UAVs 404-1, 404-2.

In some cases, a UAV 404 may join a mesh network anchored by a cellular radio of the cell site 400 before taking off from the landing pad 402. In other cases, a UAV 404 may join the mesh network after taking off. In some cases, one or more of the UAVs 404 may remain a part of the mesh network through one or more cycles of taking off, flying, and landing.

Figure 5:
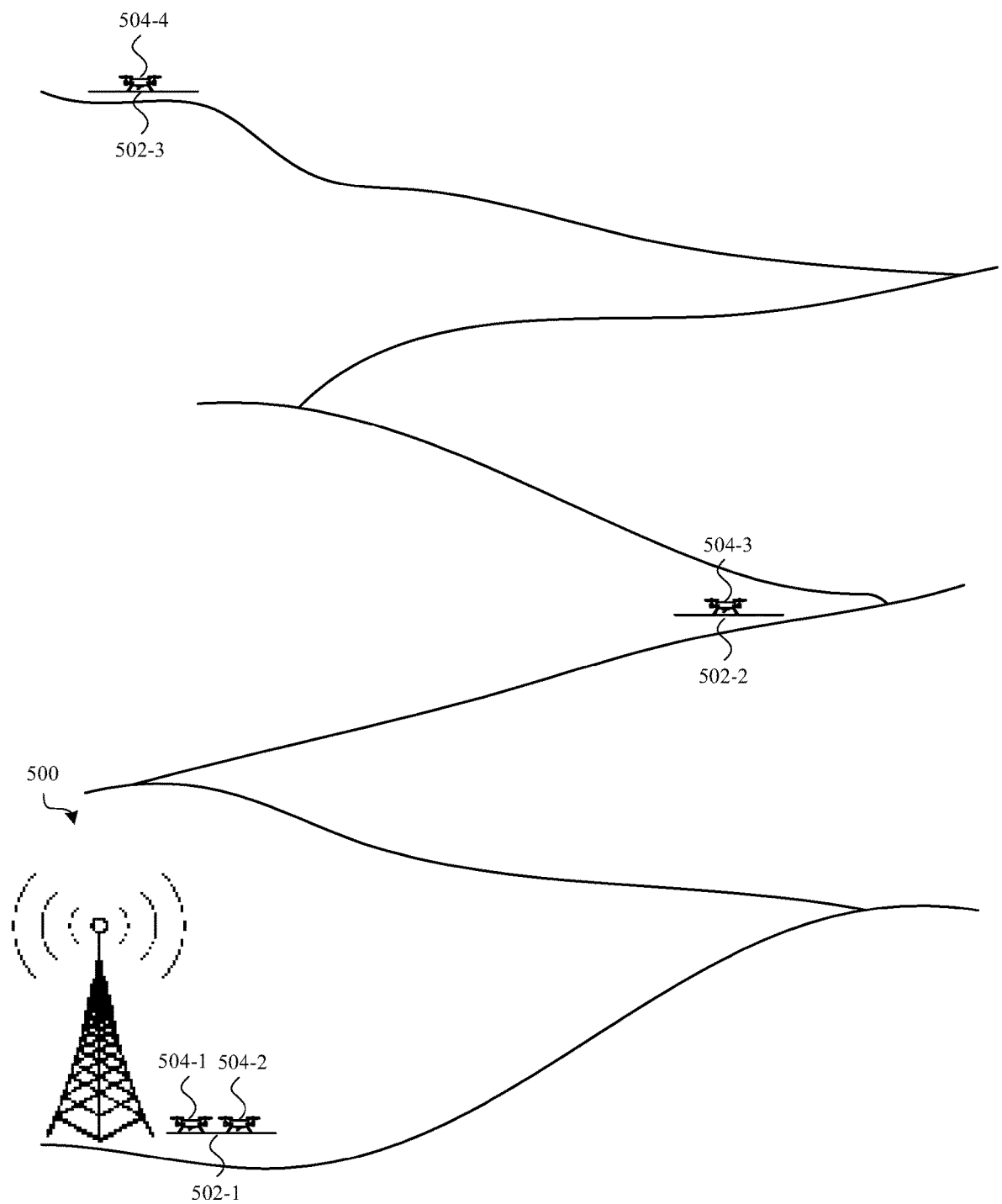
FIG. 5 shows an example cell site and set of landing pads.

FIG. 5 shows an example cell site 500 and set of landing pads 502. One of the landing pads 502-1 may be co-located with the cell site 500 and one or more other landing pads 502-2, 502-3 may be located remote from the cell site 500. Alternatively, all of the landing pads 502 may be located remote from the cell site 500. One or more UAVs 504 may be positioned on, or land on, each of the landing pads 502. Each of the landing pads 502 may be on the ground, on a rooftop, on a vehicle, on a barge, and so on. In some embodiments, the cell site 500 may be one of the cell sites described with reference to FIG. 1A, 1B, 2, or 4. In some embodiments, the UAVs 504 may be examples of the UAVs described with reference to FIG. 1A, 1B, 3, or 4.

In some cases, the cell site 500 may communicate a flight plan to one or more UAVs 504-1, 504-2 that are within range of the cell site 500. In the case of a cell site that communicates with UAVs using 3GPP 5G NR communications, "within range" may mean that an antenna of the cell site 500 has line-of-sight access with the UAV(s) 504-1, 504-2. In some embodiments, the set of UAVs 504-1, 504-2 that are within range of the cell site 500 may only include the UAV(s) 504-1, 504-2 that are on the landing pad 502-1 at the cell site 500 and/or in-air UAVs that are intended to land on the landing pad 502-1 at the cell site 500.

The cell site 500 may also communicate flight plans to UAVs 504-3, 504-4 positioned on the remote landing pads 502-2, 502-3 but, instead of doing so directly, may transmit the flight plans to UAVs 504-1, 504-2 that are within range of the remote UAVs 504-3, 504-4, or transmit the flight plans into the mesh network, for forwarding and delivery to the remote UAVs 504-3, 504-4 by in-air UAVs that are within range of the remote UAVs 504-3, 504-4.

Figure 6A:
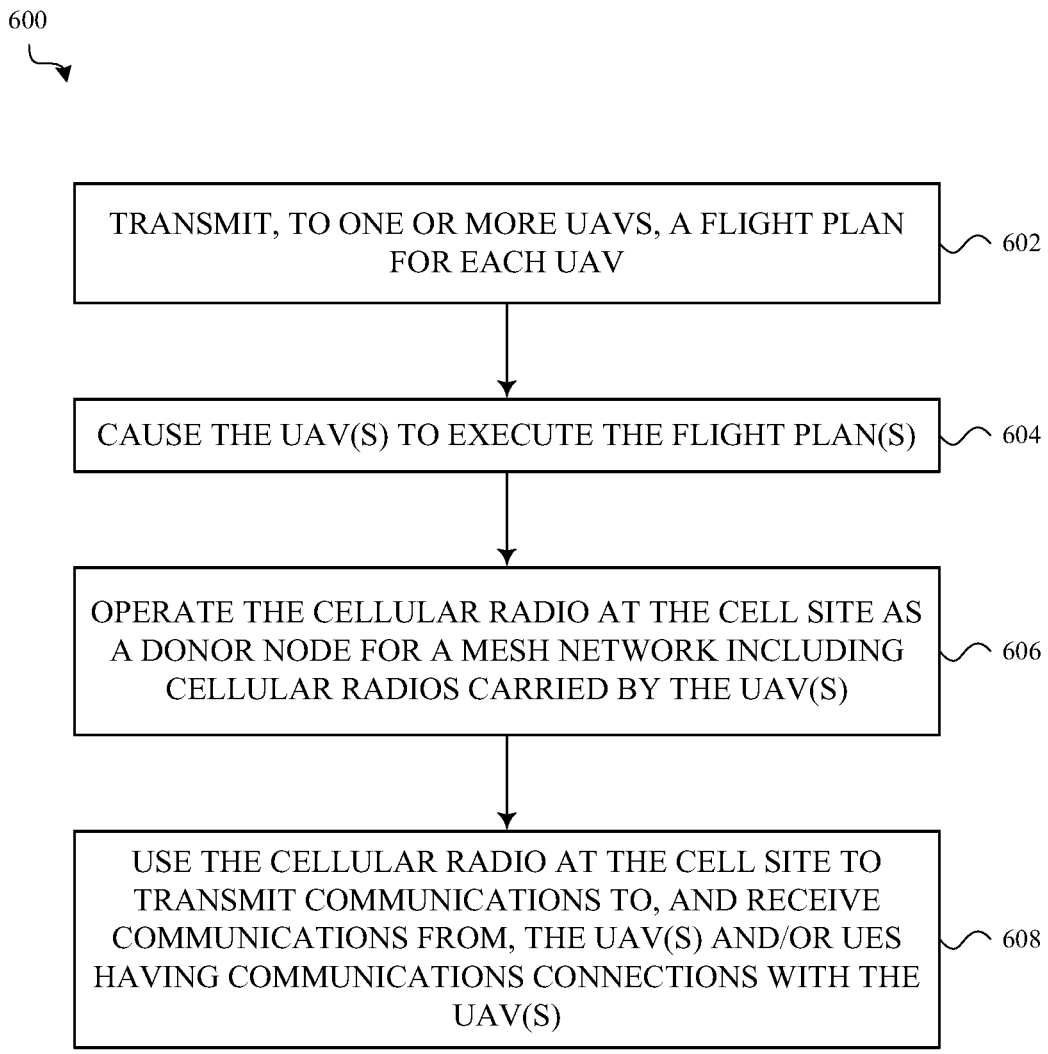
FIGS. 6A and 6B show example methods of operating a cell site of a cellular radio access network as a donor node of a mesh network, in which the mesh network includes a set of cellular radios carried by a set of UAVs.

FIG. 6A shows an example method 600 of operating a cell site of a cellular radio access network as a donor node of a mesh network, in which the mesh network includes a set of cellular radios carried by a set of UAVs.

At block 602, the method 600 may include transmitting, from a cell site to a set of one or more UAVs, a flight plan for each UAV. Different flight plans may be transmitted to different UAVs. In some embodiments, the flight plans may be transmitted to the UAVs via a cellular radio of the cell site.

At block 604, the method 600 may include the cell site causing the UAV(s) to execute the flight plan(s) and fly to a location (or locations) indicated by the flight plan(s).

At block 606, the method 600 may include the cell site operating the cellular radio at the cell site as a donor node for a mesh network. The mesh network may include cellular radios carried by the UAVs, which cellular radios are operated as child nodes of the mesh network. In some embodiments, the mesh network may be established before the UAVs take off. In some embodiments, the mesh network may be established while the UAVs are in the air.

At block 608, the method 600 may include using the cellular radio of the cell site to transmit communications to, and receive communications from, the UAV(s) and/or UEs that have established connections with the cellular radios of the UAVs.

In some embodiments of the method 600, the cellular radio access network may be a 3GPP 5G NR radio access network, and the cellular radios of the cell site and UAVs may be operated in accordance with a 3GPP 5G NR communications protocol. In these cases, the mesh network may be established using a 3GPP 5G NR IAB protocol.

Figure 6B:
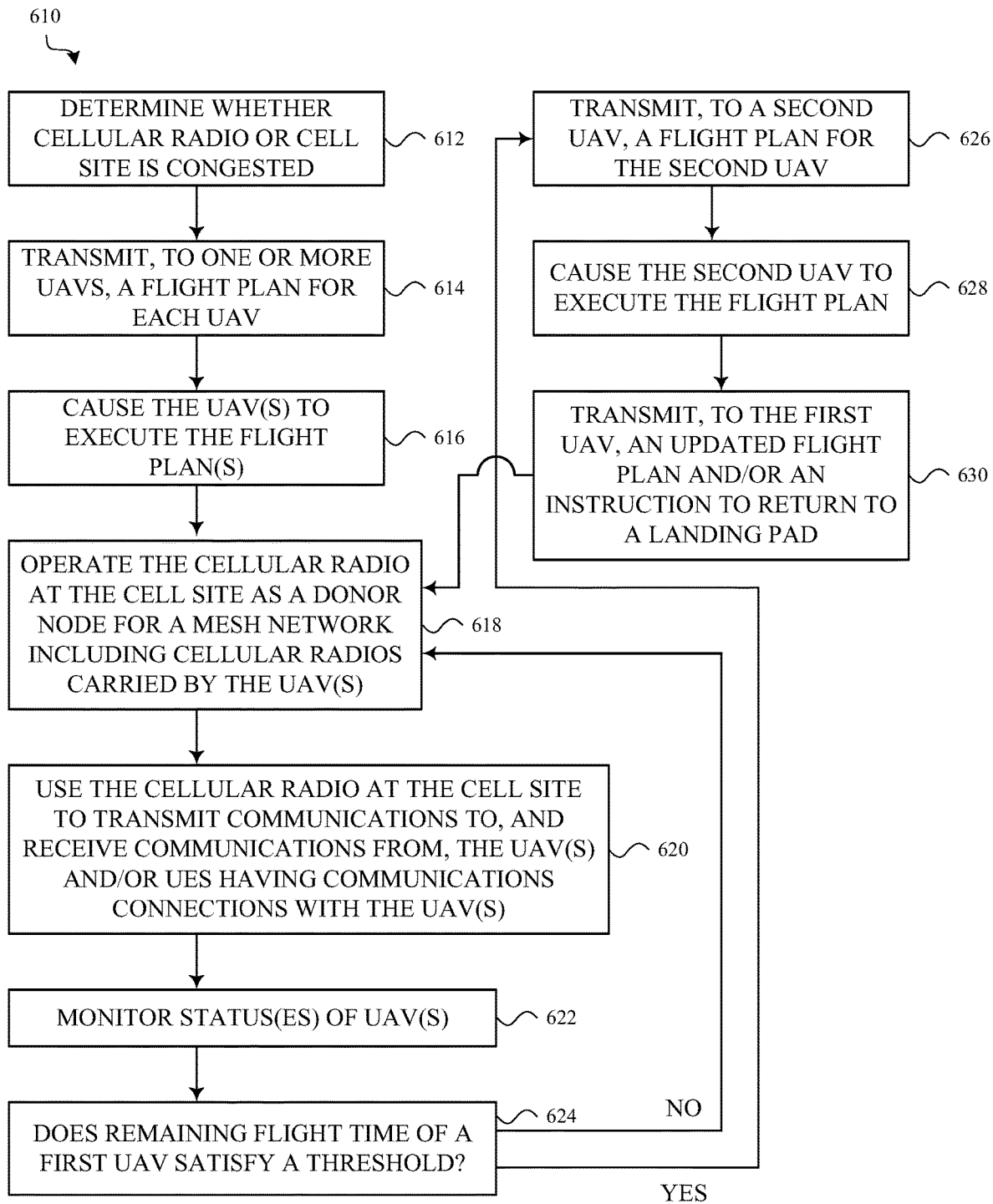

FIG. 6B shows another example method 610 of operating a cell site of a cellular radio access network as a donor node of a mesh network, in which the mesh network includes a set of cellular radios carried by a set of UAVs.

At block 612, the method 610 may include the cell site determining whether a cellular radio or cell site is congested, or receiving an indication that the cellular radio or cell site is congested, as described elsewhere herein. Alternatively, it may be determined, at block 612, whether a nearby cell site is not operational, or whether other conditions exist that would necessitate a need to instantiate or grow a mesh network anchored by the cell site. When it is determined that the cellular radio or cell site is congested, or that any of the other conditions are met, the method 610 may proceed to block 614; else, the method 600 may periodically or otherwise determine again whether the cellular radio or cell site is congested.

At block 614, and upon the cell site determining the cellular radio or cell site is congested, the method 610 may include transmitting, from the cell site to a set of one or more UAVs, a flight plan for each UAV. Different flight plans may be transmitted to different UAVs. In some embodiments, the flight plans may be transmitted to the UAVs via a cellular radio of the cell site.

At block 616, the method 610 may include the cell site causing the UAV(s) to execute the flight plan(s) and fly to a location (or locations) indicated by the flight plan(s).

At block 618, the method 610 may include the cell site operating the cellular radio at the cell site as a donor node for a mesh network. The mesh network may include cellular radios carried by the UAVs, which cellular radios are operated as child nodes of the mesh network. In some embodiments, the mesh network may be established before the UAVs take off. In some embodiments, the mesh network may be established while the UAVs are in the air.

At block 620, the method 610 may include using the cellular radio at the cell site to transmit communications to, and receive communications from, the UAV(s) and/or UEs that have established communications connections with the cellular radios of the UAVs.

At block 622, the method 610 may include the cell site monitoring the status of the UAV(s). The monitoring may include the monitoring of UAV battery statuses, failures, environmental conditions, and so on.

At block 624, the method 610 may include determining, using a battery status of a UAV (e.g., a first UAV), whether a remaining flight time of the UAV satisfies a threshold. When the threshold is not satisfied, the cell site may continue to perform the operations at blocks 618-622. However, when the threshold is satisfied, the method 610 may continue at block 626, where the method 610 may include transmitting, from the cell site to another UAV (e.g., a second UAV), a flight plan for the second UAV. Other monitored conditions may also be analyzed to determine whether the UAV should return to its landing pad and/or whether another UAV should be dispatched to take the UAV's place in the mesh network.

At block 628, the method 610 may include the cell site causing the second UAV to execute its flight plan and fly to a location indicated by its flight plan.

At block 630, the method 610 may include transmitting, from the cell site to the first UAV, an updated flight plan and/or instruction to return to a landing pad.

Contemporaneously with the operations at block 630, the method 610 may include performing the operations at blocks 618-622 for the second UAV and other UAVs included in the mesh network.

In some embodiments of the method 610, the cellular radio access network may be a 3GPP 5G NR radio access network, and the cellular radios of the cell site and UAVs may be operated in accordance with a 3GPP 5G NR communications protocol. In these cases, the mesh network may be established using a 3GPP 5G NR IAB protocol.

Figure 7:
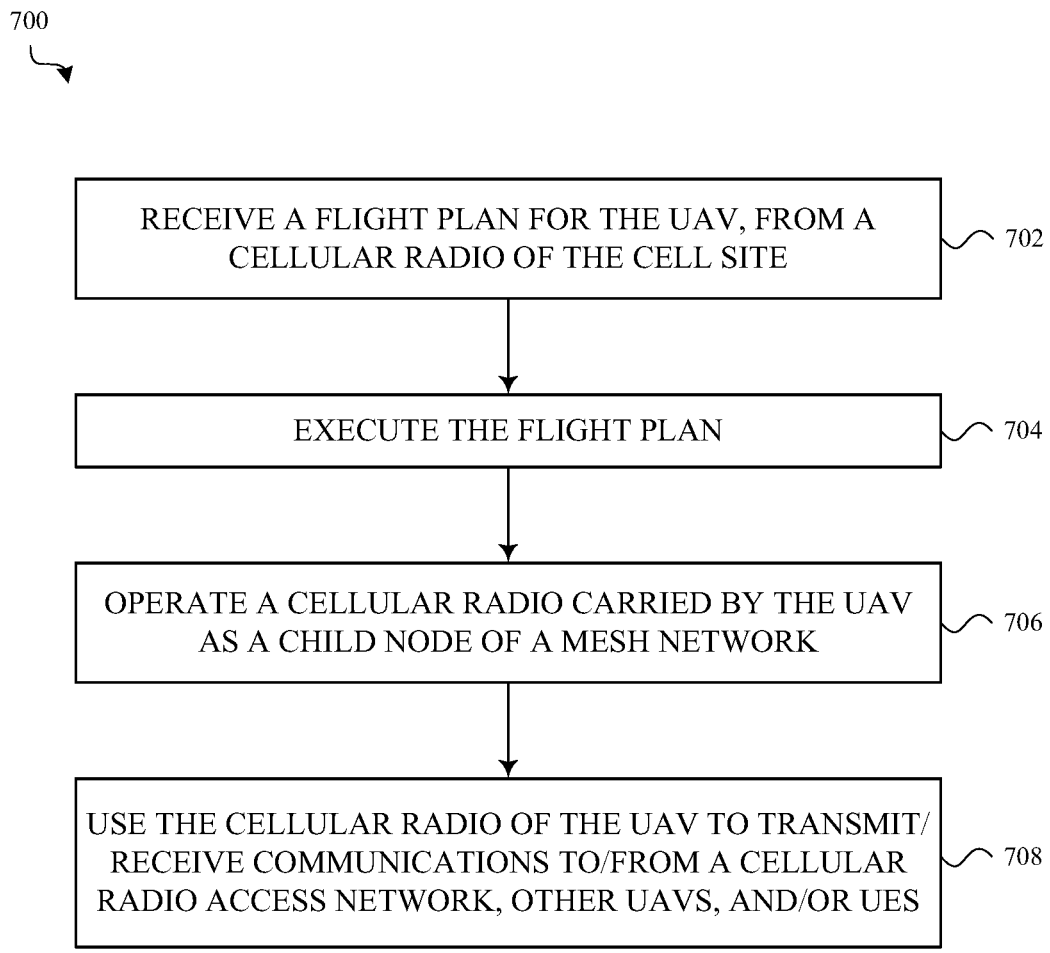
FIG. 7 shows an example method of operating a UAV as a child node of a mesh network.

FIG. 7 shows an example method 700 of operating a UAV as a child node of a mesh network. The mesh network may be anchored to a cell site of a cellular radio access network, which cell site serves as a donor node for the mesh network.

At block 702, the method 700 may include receiving a flight plan for the UAV. The flight plan may be received from a cellular radio of the cell site, at a cellular radio carried by the UAV.

At block 704, the method 700 may include executing the flight plan at the UAV and flying to a location indicated by the flight plan.

At block 706, the method 700 may include the operating the cellular radio carried by the UAV as a child node of the mesh network. In some embodiments, the cellular radio carried by the UAV may be incorporated into the mesh network before the UAV takes off. In some embodiments, the cellular radio carried by the UAV may be added to the mesh network while the UAV is in the air.

At block 708, the method 700 may include using the cellular radio carried by the UAV to transmit communications to, and receive communications from, the cell site, other UAVs, and/or UEs that have established connections with the cellular radio carried by the UAV.

In some embodiments of the method 700, the cellular radio access network may be a 3GPP 5G NR radio access network, and the cellular radios of the cell site and UAV may be operated in accordance with a 3GPP 5G NR communications protocol. In these cases, the mesh network may be established using a 3GPP 5G NR IAB protocol.

In some embodiments, the order of operations in the described methods may be performed in different orders or include more or fewer operations. In some embodiments, various operations of the methods may be performed contemporaneously or in parallel.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A cell site of a cellular radio access network, comprising:
    a set of UAVs including at least a first UAV and a second UAV;
    a first cellular radio; and
    a processing system configured to,
        transmit a first flight plan to the first UAV via the first cellular radio;
        cause the first UAV to execute the first flight plan and fly to a location indicated by the first flight plan;
        operate the first cellular radio as a donor node for a mesh network, the mesh network including a second cellular radio carried by the first UAV and operated as a child node of the mesh network;
        receive a status of a battery of the first UAV while the first UAV is in the air;
        determine, using the status, that a remaining flight time of the first UAV satisfies a threshold;
        transmit a second flight plan to the second UAV via the first cellular radio;
        in response to determining that the remaining flight time of the first UAV satisfies the threshold, cause the second UAV to execute the second flight plan;
        cause a third cellular radio carried by the second UAV to be operated as a replacement for the second cellular radio within the mesh network; and
        update the flight plan transmitted to the first UAV to cause the first UAV to return to the cell site.

2. The cell site of claim 1, wherein the UAV is a first UAV and the cell site further comprises:
    a landing pad for the set of UAVs.

3. The cell site of claim 1, wherein:
    the processing system is further configured to,
        transmit, to the first UAV and via the first cellular radio,
            a third flight plan for a second third UAV;
            a first instruction causing the third UAV to execute the third flight plan; and
            a second instruction causing the first UAV to transmit the third flight plan and the first instruction to the third UAV.

4. The cell site of claim 3, wherein:
    the cell site lacks line-of-sight access with a landed position of the third UAV; and
    the processing system is configured to cause the first UAV to maneuver to an in-air position at which the first UAV has line-of-sight access with the third UAV before the first UAV transmits the third flight plan and the first instruction to the third UAV.

5. The cell site of claim 1, wherein:
    the processing system is configured to determine a congestion of the first cellular radio or the cell site satisfies a congestion threshold; and
    the processing system causes the first UAV to execute the first flight plan and fly to the location indicated by the first flight plan, in response to the congestion threshold being satisfied.

6. The cell site of claim 1, wherein:
    the processing system is configured to receive, from an edge computing resource, an indication that a congestion of the first cellular radio or the cell site satisfies a congestion threshold; and
    the processing system causes the first UAV to execute the first flight plan and fly to the location indicated by the first flight plan, in response to receiving the indication.

7. The cell site of claim 1, wherein:
    the cellular radio access network is a 3GPP 5G NR cellular radio access network; and
    the mesh network is established using a 3GPP 5G NR Integrated Access and Backhaul (IAB) protocol.

8. A cell site of a cellular radio access network, comprising:
    a first cellular radio; and
    a processing system configured to,
        determine a congestion of the first cellular radio or the cell site satisfies a congestion threshold;
        transmit a flight plan to an unmanned aerial vehicle (UAV) via the first cellular radio;
        cause the UAV to execute the flight plan and fly to a location indicated by the flight plan, in response to the congestion threshold being satisfied; and
        operate the first cellular radio as a donor node for a mesh network, the mesh network including a second cellular radio carried by the UAV and operated as a child node of the mesh network.

9. The cell site of claim 8, further comprising:
    the UAV; and
    a landing pad for the UAV.

10. The cell site of claim 8, wherein the UAV is a first UAV and the cell site further comprises:
    a set of UAVs including at least the first UAV and a second UAV; and
    a landing pad for the set of UAVs.

11. The cell site of claim 10, wherein:
    the processing system is configured to,
        receive a status of a battery of the first UAV while the first UAV is in the air;
        determine, using the status, that a remaining flight time of the first UAV satisfies a threshold;
        transmit a second flight plan to the second UAV via the first cellular radio;
        in response to determining that the remaining flight time of the first UAV satisfies the threshold, cause the second UAV to execute the second flight plan;

cause a third cellular radio carried by the second UAV to be operated as a replacement for the second cellular radio within the mesh network; and
update the flight plan transmitted to the first UAV to cause the first UAV to return to the landing pad.

12. The cell site of claim 8, wherein:
the UAV is a first UAV; and
the processing system is further configured to,
transmit, to the first UAV and via the first cellular radio, a second flight plan for a second UAV;
a first instruction causing the second UAV to execute the second flight plan; and
a second instruction causing the first UAV to transmit the second flight plan and the first instruction to the second UAV.

13. The cell site of claim 12, wherein:
the cell site lacks line-of-sight access with a landed position of the second UAV; and
the processing system is configured to cause the first UAV to maneuver to an in-air position at which the first UAV has line-of-sight access with the second UAV before the first UAV transmits the second flight plan and the first instruction to the UAV.

14. The cell site of claim 8, wherein:
the cellular radio access network is a 3GPP 5G NR cellular radio access network; and
the mesh network is established using a 3GPP 5G NR Integrated Access and Backhaul (IAB) protocol.

15. A cell site of a cellular radio access network, comprising:
a first cellular radio; and
a processing system configured to,
receive, from an edge computing resource, an indication that a congestion of the first cellular radio or the cell site satisfies a congestion threshold;
transmit a flight plan to an unmanned aerial vehicle (UAV) via the first cellular radio;
cause the UAV to execute the flight plan and fly to a location indicated by the flight plan, in response to receiving the indication; and
operate the first cellular radio as a donor node for a mesh network, the mesh network including a second cellular radio carried by the UAV and operated as a child node of the mesh network.

16. The cell site of claim 15, further comprising:
the UAV; and
a landing pad for the UAV.

17. The cell site of claim 15, wherein the UAV is a first UAV and the cell site further comprises:
a set of UAVs including at least the first UAV and a second UAV; and
a landing pad for the set of UAVs.

18. The cell site of claim 17, wherein:
the processing system is configured to,
receive a status of a battery of the first UAV while the first UAV is in the air;
determine, using the status, that a remaining flight time of the first UAV satisfies a threshold;
transmit a second flight plan to the second UAV via the first cellular radio;
in response to determining that the remaining flight time of the first UAV satisfies the threshold, cause the second UAV to execute the second flight plan;
cause a third cellular radio carried by the second UAV to be operated as a replacement for the second cellular radio within the mesh network; and
update the flight plan transmitted to the first UAV to cause the first UAV to return to the landing pad.

19. The cell site of claim 15, wherein:
the UAV is a first UAV; and
the processing system is further configured to,
transmit, to the first UAV and via the first cellular radio, a second flight plan for a second UAV;
a first instruction causing the second UAV to execute the second flight plan; and
a second instruction causing the first UAV to transmit the second flight plan and the first instruction to the second UAV.

20. The cell site of claim 19, wherein:
the cell site lacks line-of-sight access with a landed position of the second UAV; and
the processing system is configured to cause the first UAV to maneuver to an in-air position at which the first UAV has line-of-sight access with the second UAV before the first UAV transmits the second flight plan and the first instruction to the UAV.

* * * * *